United States Patent
Papaefstathiou et al.

(10) Patent No.: US 8,073,671 B2
(45) Date of Patent: Dec. 6, 2011

(54) DYNAMIC SOFTWARE PERFORMANCE MODELS

(75) Inventors: Efstathios Papaefstathiou, Redmond, WA (US); John M. Oslake, Seattle, WA (US); Jonathan C. Hardwick, Kirkland, WA (US); Pavel A. Dournov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 11/394,474

(22) Filed: Mar. 31, 2006

(65) Prior Publication Data

US 2007/0239766 A1    Oct. 11, 2007

(51) Int. Cl.
 *G06F 9/455* (2006.01)
(52) U.S. Cl. ........... 703/22; 703/14; 703/19; 703/20; 703/21; 703/13; 716/106; 716/108; 716/113
(58) Field of Classification Search .......... 703/22, 703/13, 14, 19, 20, 21; 714/4, 13, 31, 38, 714/47; 716/106, 108, 113
See application file for complete search history.

(56) References Cited

U.S. PATENT DOCUMENTS

| | | | |
|---|---|---|---|
| 5,018,095 A | | 5/1991 | Nissimov |
| 5,088,058 A | | 2/1992 | Salsburg |
| 5,313,617 A | | 5/1994 | Nakano |
| 5,809,282 A | | 9/1998 | Cooper |
| 5,848,270 A | * | 12/1998 | DeLuca et al. .......... 718/105 |
| 5,881,268 A | * | 3/1999 | McDonald et al. ......... 703/21 |
| 6,038,619 A | * | 3/2000 | Berning et al. ............ 710/33 |
| 6,205,413 B1 | * | 3/2001 | Bisdikian et al. .......... 703/24 |
| 6,542,854 B2 | * | 4/2003 | Yang et al. ............... 702/186 |
| 6,560,564 B2 | * | 5/2003 | Scarlat et al. ............ 702/186 |
| 6,584,545 B2 | * | 6/2003 | Bachmat et al. ........... 711/114 |
| 6,606,585 B1 | | 8/2003 | Borowsky |
| 6,738,386 B1 | | 5/2004 | Holmqvist |
| 6,865,527 B2 | | 3/2005 | Go |
| 6,978,259 B1 | | 12/2005 | Anderson |
| 6,996,517 B1 | * | 2/2006 | Papaefstathiou ............ 703/22 |
| 7,035,971 B1 | | 4/2006 | Merchant |
| 7,058,560 B1 | * | 6/2006 | Arakawa et al. ........... 703/22 |
| 7,107,187 B1 | * | 9/2006 | Saghier et al. ............ 702/186 |
| 7,200,545 B2 | | 4/2007 | Lines |
| 7,403,886 B2 | * | 7/2008 | Odhner et al. ............ 703/21 |
| 7,509,646 B1 | * | 3/2009 | Maw et al. ............... 718/105 |

(Continued)

OTHER PUBLICATIONS

U.S. Appl. No. 11/401,077, filed Apr. 10, 2006, Papaefstathiou, et al.

(Continued)

*Primary Examiner* — Kamini S Shah
*Assistant Examiner* — Kibrom Gebresilassie
(74) *Attorney, Agent, or Firm* — Workman Nydegger (57) ABSTRACT

Simulating an application. A method that may be practiced in a computing environment configured for simulating an application modeled by an application model deployed in a performance scenario of a computing system by deploying service models of the application model to device models modeling devices. The method includes referencing a performance scenario to obtain a transaction being modeled as originating from a first device model. The transaction invokes of a first service model. The first service model specifies hardware actions for simulation. The first service model is referenced to determine the hardware actions for simulation and the next referenced service. The next referenced service specifies hardware actions to be added to the transaction and may specify invocation of other service models. A chain of hardware actions is generated by following the invocation path of the service models. The hardware actions are applied to device models to simulate the transaction.

16 Claims, 3 Drawing Sheets

U.S. PATENT DOCUMENTS

| | | | |
|---|---|---|---|
| 7,571,088 B2* | 8/2009 | Papaefstathiou et al. | 703/16 |
| 2002/0029256 A1 | 3/2002 | Zintel | |
| 2002/0062431 A1 | 5/2002 | Benedix | |
| 2002/0161566 A1* | 10/2002 | Uysal et al. | 703/21 |
| 2002/0188592 A1 | 12/2002 | Leonhardt | |
| 2002/0199205 A1 | 12/2002 | Sonawane | |
| 2003/0028722 A1* | 2/2003 | Bachmat et al. | 711/112 |
| 2003/0139917 A1* | 7/2003 | Hardwick et al. | 703/21 |
| 2003/0208284 A1* | 11/2003 | Stewart et al. | 700/30 |
| 2004/0034547 A1 | 2/2004 | Birkhowlzer | |
| 2004/0194095 A1 | 9/2004 | Lumb | |
| 2005/0086331 A1* | 4/2005 | Wadia et al. | 709/221 |
| 2005/0097503 A1 | 5/2005 | Zintel | |
| 2006/0025984 A1* | 2/2006 | Papaefstathiou et al. | 703/22 |
| 2006/0161753 A1* | 7/2006 | Aschoff et al. | 711/170 |
| 2006/0184410 A1* | 8/2006 | Ramamurthy et al. | 705/8 |
| 2006/0198318 A1* | 9/2006 | Schondelmayer et al. | 370/252 |
| 2006/0235675 A1* | 10/2006 | Oslake et al. | 703/21 |
| 2006/0235859 A1* | 10/2006 | Hardwick et al. | 707/100 |
| 2006/0248510 A1* | 11/2006 | Dournov et al. | 717/124 |
| 2006/0288149 A1* | 12/2006 | LaVigne et al. | 710/306 |
| 2007/0011330 A1* | 1/2007 | Dinker et al. | 709/226 |
| 2007/0055913 A1* | 3/2007 | Atkins et al. | 714/44 |
| 2007/0162268 A1* | 7/2007 | Kota et al. | 703/14 |
| 2007/0233450 A1* | 10/2007 | Papaefstathiou et al. | 703/20 |
| 2007/0290831 A1* | 12/2007 | Kalinichenko et al. | 340/506 |
| 2008/0140931 A1* | 6/2008 | Nakamura et al. | 711/114 |
| 2009/0006071 A1* | 1/2009 | Dournov et al. | 703/22 |

OTHER PUBLICATIONS

U.S. Appl. No. 11/394,483, filed Mar. 31, 2006, Papaefstathiou, et al.
U.S. Appl. No. 11/394,473, filed Mar. 31, 2006, Peterson, et al.
U.S. Appl. No. 11/394,945, filed Mar. 31, 2006, Papaefstathiou, et al.
U.S. Appl. No. 11/105,251, filed Apr. 13, 2005, Dournov, et al.
An Analytic Performance Model of Disk Arrays by Edward K Lee et al., ACM 1993 pp. 98-109.
De et al., Dynamic Multipath Routing (DMPR): An Approach to Improve Resource Utilization in Networks for Real-Time Traffic, Modeling, Analysis, and Simulation of Computer and Telecomunications Systems, Aug. 2001, pp. 23-30.
Thakore, et al., Routing with Persistent Link Modeling in Intermittently Connnected Wireless Networks, IEEE Military Communications Conference, Oct. 2005, pp. 461-467.
Papaefstathiou, "Design of a Performance Technology Infrastructure to Suppoort the Construction of a Responsive Software", WOSP 2000, ACM, Ontario Canada.
Amer et al., "Performance Evaluation of a Hierarchical Hybrid Adaptive Routing Algorithm for Large Scale Computer Communication Networks", Department of Computer and Information Systems, The Ohio State University, 1988, IEEE.
IBM Corporation OEM Hard Disk Drive Specifications for DAQA-32160-32700-33240 3.5-Inch Hard Disk Drive with ATA Interface Revision (2.0) Sep. 10, 1996.
Office Action dated Apr. 14, 2009 cited in U.S. Appl. No. 11/394,473.
Office Action dated Oct. 7, 2008 cited in U.S. Appl. No. 11/041,077.
Notice of Allowance dated Mar. 23, 2009 cited in U.S. Appl. No. 11/041,077.
Office Action dated Feb. 26, 2009 cited in U.S. Appl. No. 11/394,483.
Notice of Allowance dated May 8, 2009 cited in U.S. Appl. No. 11/394,483.
Office Action dated Apr. 6, 2009 cited in U.S. Appl. No. 11/394,945.
Office Action dated Nov. 30, 2009 cited in U.S. Appl. No. 11/394,473.
U.S. Appl. No. 11/394,473, mail date May 3, 2010, Office Action.

* cited by examiner

DYNAMIC SOFTWARE PERFORMANCE MODELS

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computer systems can be interconnected in large network configurations so as to provide additional functionality. For example, one typical network configuration is a configuration of computer systems interconnected to perform e-mail functionality. In one particular example, an e-mail server acts as a central location where users can send and retrieve emails. For example, a user may send an e-mail to the e-mail server with instructions to the e-mail server to deliver the message to another user connected to the e-mail server. Users can also connect to the e-mail server to retrieve messages that have been sent to them. Many e-mail servers are integrated into larger frameworks to provide functionality for performing scheduling, notes, tasks, and other activities.

Each of the computer systems within a network environment has certain hardware limitations. For example, network cards that are used to communicate between computer systems have a limited amount of bandwidth meaning that communications can only take place at or below a predetermined threshold rate. Computer processors can only process a given amount of instructions in a given time period. Hard disk drives are limited in the amount of data that can be stored on the disk drive as well as limited in the speed at which the hard disk drives can store the data.

When creating a network that includes a number of different computer system it may be desirable to evaluate the selected computer systems before they are actually implemented in the network environment. By evaluating the systems prior to actually implementing them in the network environment, trouble spots can be identified and corrected. This can result in a substantial cost savings as systems that unduly impede performance can be upgraded or can be excluded from a network configuration.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment herein includes computer readable media that may be implemented in a computing environment configured for simulating a computing system. The computer readable medium includes a first data structure defining an application model to model a computer application. The application model includes service models defined within the application model. The services models are designed to model application modules that process requests to implement functionality of the application. The definition of service models includes definitions of hardware actions.

Another embodiment described herein includes a method that may be practiced in a computing environment configured for simulating an application modeled by an application model. The application model describes an application that may be used in a performance scenario of a computing system by assigning service models of the application model to device models modeling devices in the computing system in the performance scenario. The method includes actions for simulating the application. The method includes referencing a performance scenario to obtain transactions for simulation as originating from one or more respective entry service model. The transaction specifies the invocation of an entry service model of an application model. The entry service model specifies hardware actions to be simulated and may specify invocation of other service models. The service models are referenced to determine the hardware actions to be simulated for the transactions. A chain of hardware actions is generated and the hardware-actions are applied to one or more device models to simulate the transaction.

Yet another embodiment described herein includes a method that may be practiced in a computing environment configured for simulating a distributed or local computing system. The method includes actions for creating a model embodied on a computer readable medium. The method includes defining in a computer readable medium interconnections of device models, the device models representing hardware devices in a computing environment. Deployment of an application model is defined in the computer readable medium by defining mapping of service models of the application model to one or more of the device models. The service models define hardware activities to be simulated by the device models.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Figure 1:
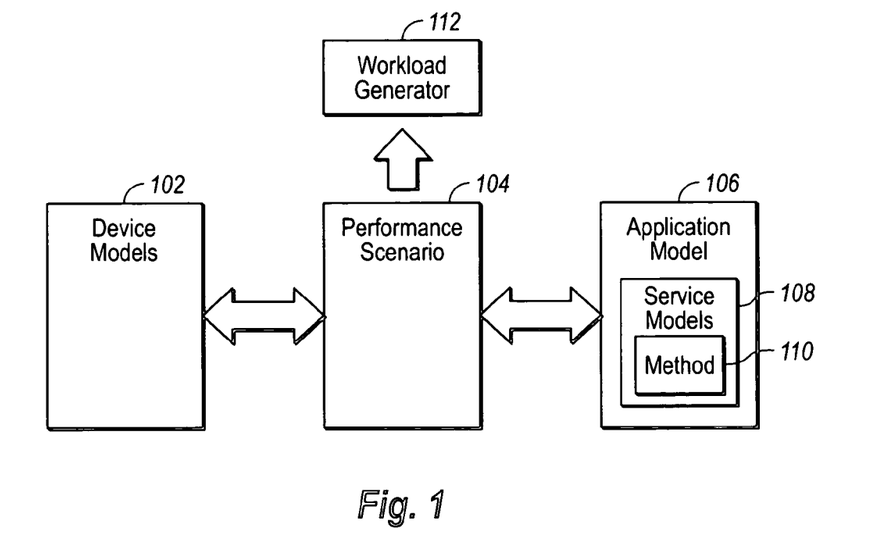
FIG. 1 illustrates the interaction between models for simulating computer systems.

Some embodiments described herein are useful in simulating applications in a specific environment. For example, it is often useful to simulate complex applications distributed across several computer systems before actually deploying the application. For example, an email environment application, including a server such as Exchange server and a client such as Outlook both available from Microsoft Corporation of Redmond Wash. may have one or more servers deployed in a distributed environment and one or more clients deployed in the environment that access the servers. To simulate the application, one embodiment uses two models including one or more application models and one or more device models, in combination with a performance scenario. Referring now to FIG. 1, an environment 100 is illustrated including device models 102, a performance scenario 104, and an application model 106. When a performance scenario 104 is created, one or more application models 106 and device models 102 are instantiated to conform to the configuration of that particular performance scenario 104 both in terms of application deployment and usage. For example, an application model 106 may define a parameter which describes a number of sites, and a device model 102 of a network link may define a parameter which describes its bandwidth. A particular performance scenario 104 may contain two sites which are connected by a network link supporting 1.5 Mbits/sec.

The application model 106 may include service models 108 modeling services found in the application. The application model 106 and service models 108 define application behavior independently of a particular hardware deployment. This allows the application to be simulated in a number of different environments with different computer hardware configurations represented by the device models 102. The service models 108 may include methods 110 which specifically define hardware actions. For example, a method 110 may specifically call out a certain number of cpu cycles, I/O reads and/or writes, and/or a given amount of network traffic. In sum, a method includes a workload description including action costs for each transaction defined by the application model 106.

The device models 102 define device behaviors. For example, a device model for a disk drive may define the disk drive in terms of latencies for I/O operations. In particular, the disk drive model may define latencies for random and sequential reads and writes of various sizes. The following is an example of a device model definition for a single disk configuration:

```
<DeviceConfiguration
Type="Microsoft.CapacityManager.Modeling.DeviceModels.DiskSimulationModel">
    <!--
        Manufacturer: Hewlett-Packard
        Model: BF036863B9
    -->
    <Property Name="Guid" Value="09AD9CB0-BBD5-4204-8ABF-894A103A83D7"/>
    <Property Name="Name" Value="SCSI 320, 15K RPM, 36 GB" />
    <Property Name="StorageSize" Value="36400000000" />
    <Property Name="InterfaceType" Value="SCSI" />
    <Property Name="SeekTime" Value="0.0038" />
    <Property Name="RotationalSpeed" Value="250" />
    <Property Name="ExternalTransferRate" Value="320000000" />
    <Property Name="InternalTransferRate" Value="762000000" />
    <Property Name="ControllerCacheSize" Value="8388608" />
    <Property Name="RandomReadLatencyConstant" Value="4.062E-03" />
    <Property Name="RandomReadLatencySlope" Value="2.618E-08" />
    <Property Name="RandomWriteLatencyConstant" Value="4.596E-03" />
    <Property Name="RandomWriteLatencySlope" Value="1.531E-08" />
    <Property Name="SequentialReadLatencyConstant" Value="1.328E-04" />
    <Property Name="SequentialReadLatencySlope" Value="9.453E-09" />
    <Property Name="SequentialWriteLatencyConstant" Value="2.531E-03" />
    <Property Name="SequentialWriteLatencySlope" Value="1.521E-08" />
</DeviceConfiguration>
```

In the example above, several parameters are specified including the type of device, the storage size, the interface type, the seek time, the rotational speed, the external transfer rate, the internal transfer rate, the controller cache size, and the various constants and slopes defining latency according to I/O size. Specifically, the constants and slope can be used to calculate a latency given a type of I/O operations (i.e. random read, random write, sequential read or sequential write) and the size of the I/O operation. The size of the I/O operation X the slope+the constant results in the latency of the I/O operation.

Similarly, latencies may be defined for various other device models such as cpu models, network and networking hardware models, and the like.

It should be noted that device model can be included as part of other models. In particular, a composite storage device can be modeled by using a hierarchical data structure including a number of instances of definitions of parameters for a component of the composite storage device instantiated together. For example, disk group model may include disk component models. Illustratively, the following is an XML document that illustrates one example of the single disk configuration described above being implemented in a disk group configuration:

```xml
<DeviceConfiguration
Type="Microsoft.CapacityManager.Modeling.DeviceModels.DiskGroupSimulationModel">
    <Property Name="Guid" Value="884ECD92-9690-4253-908A-A1E6640E7EDB"/>
    <Property Name="Name" Value="4-disk 15K RPM RAID-10" />
    <Property Name="RAIDLevel" Value="10" />
    <Property Name="StripeUnitSize" Value="65536" />
    <InnerConfigurations>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
        <InnerConfiguration Configuration="09AD9CB0-BBD5-4204-8ABF-894A103A83D7"/>
    </InnerConfigurations>
</DeviceConfiguration>
```

In this example of a disk group configuration, the disk group model includes four instances of the single disk configuration described previously. Illustratively, the references to <InnerConfiguration Configuration="09AD9CB0-BBD5-4204-8ABF-894A103A83D7"/> include the single disk configuration by reference.

The device behaviors may be applied to the service definitions of the application model.

The performance scenario 104 defines various interconnections between device models 102 as well as defining where service models 108 from the application model 106 are applied. In other words, the performance scenario 104 defines what device models 102 host what service models 108 of the application model 106. The performance scenario 104 is the "glue" that binds the device models 102 to the application model 106 to allow an application to be simulated in a specific hardware environment which supports a specific usage profile.

Application Model

Application models 106 are descriptions of applications and typical application usage scenarios that can be used to model various systems in which the application is used. An application model describes the application behavior independently of any particular deployment. When combined with computer and network configuration models and usage definitions the application model is instantiated in a performance scenario 104 that can be simulated or processed using discrete event simulation and transaction cost analysis. The application model 106 may include services models 108, methods 110, and transaction models. Service models 108 model services typically found in an application. Methods 110 model methods as part of the services.

Transaction models are defined by transaction sources. Transaction sources represent the transaction originating points. Transactions always start at the transaction sources. Application model transaction sources can represent real users performing certain business functions or software services that are out of the modeling scope and considered as consumers of the application services. For example, one application model user is an Outlook application sending requests to an Exchange message service. In this case the user transactions correspond to the real user interactions with the Outlook user interface. Another example is a remote SMTP service, since it is out of scope of the modeling application it is represented as a transaction source sending SMTP requests that are treated as client transactions.

An application modeling language may be used to construct the application model. In one embodiment, the application modeling language is based on XML. The integration of the language with a modeling API allows for flexibility for extending the language by allowing extensions to application models to be written in such as for example in a NET or similar XML based programming language.

As described previously, the application model 106 may include service models 108 defining services of the application and methods 110 defining methods of a service. The application model 106 further includes definitions of transactions. During simulation transaction sources initiate transactions that invoke service methods, this defines the action flow to process the transactions.

A service model 108 represents an application module that can process requests from users or from other services. To process requests the service models should be mapped, i.e. deployed, to hardware devices such as computer models. Hardware parameters and their connectivity properties are provided by the performance scenario 104. Service models 108 are the minimal units of deployment. A service model 108 cannot be partially mapped onto a device model 102. It is either fully deployed and all its functionality is available or it is not deployed and therefore is unable to handle requests. A service model 108 may include a named set of methods 110 and resource models. There can be any number of service models 108 in an application model script. A service method 110 includes a named set of actions. Each method 110 defines an action flow to process any requests sent to this method. A method 110 can contain device actions, invocations of other service methods 110, action flow control statements and scheduling functions.

A method 110 in a service model 108 describes an atomic service operation that can include hardware actions and invocations of other service methods 110. Each method 110 is identified by a service model name and a method name. The combination of the service and method names is preferably unique in the entirety of the application model script. A method 110 can have input parameters which if declared should be passed by the method caller.

Methods 110 can be invoked by other methods 110 or by client transactions using the <invoke> action statement. When a method 110 finishes, it can send a message back to the caller using the <return> statement. The return statement sends the message to the same entity that initiated the method call.

The following is an example of a script defining service and methods in an application model.

```
<services>
  <service name="IIS">
    <method name="GetHomePage">
      <action type="compute">
        <param name="MCycles" value="23000"/>
        <param name="ClockSpeed" value="800"/>
      </action>
      <invoke service="SQL" method="GetPersonalData"/>
      <invoke service="SQL" method="GetPageContents"/>
      <action type="compute">
        <param name="MCycles" value="40000"/>
        <param name="ClockSpeed" value="800"/>
      </action>
      <return size="20000">
    </method>
  </service>
  <service name="SQL">
    <method name="GetPersonalData">
      <action type="compute">
        <param name="MCycles" value="50000"/>
        <param name="ClockSpeed" value="800"/>
      </action>
      <action type="diskio">
        <param name="datasize" value="10000"/>
        <param name="direction" value="read"/>
      </action>
      <return size="8000"/>
    </method>
    <method name="GetPageContents">
      <action type="compute">
        <param name="MCycles" value="60000"/>
        <param name="ClockSpeed" value="800"/>
      </action>
      <action type="diskio">
        <param name="datasize" value="20000"/>
        <param name="direction" value="read" />
      </action>
      <return size="10000"/>
    </method>
  </service>
</services>
```

The application model script above describes two services IIS and SQL. IIS service contains a GetHomePage method which when called causes a computation action that models 23,000 mega cycles on an 800 MHz CPU. The GetHomePage method then invokes the GetPersonalData and GetPageContents methods on the SQL service. The GetHomePage method then causes another computation action that models an additional 40,000 megacycles on an 800 MHz CPU. The GetHomePage method then returns back to the caller the result message that contains 20 K of data. The SQL service methods illustrated above include CPU actions and disk I/O operations. Additionally, as will be described in more detail below, if the performance scenario has the IIS service and the SQL service on different computer models, then when the GetHomePage method associated with the IIS service invokes the GetPersonalData and GetPageContents methods on the SQL service network hardware actions will also be simulated as well as when the 20 K of data is returned.

As noted previously, the application model 106 is independent of any specific hardware. Application model scripts can be built with minimal assumptions regarding the hardware to which the services will be mapped. For example it can be assumed that the computers can be grouped into offices or sites and each computer can be identified by the pair of site name and computer or host name. The computers can be connected within offices as well as across offices with networks. The exact computer connections may be unknown to the application model script although it can access the connectivity data to perform the site and host scheduling using built-in functions. The presence of communication actions in the modeled transactions will depend upon the service deployment. In other words some communication actions such as network actions will only be used if the caller and the target service are located on different hosts. Communication actions in this case will be derived automatically based on a routing table and a computer-network connectivity matrix. This will allow more accurate modeling services located on the same computer and communicating over some optimized "shared-memory" protocol that would be replaced by network communications if such services are remote. Service models 108 and users will be associated with device models 102, and specifically host or computer models, before simulation so that an application model script developer can assume that the services are executed on a certain hardware device model 102. More generally, the transactions generated by the application model can reflect the application deployment that is specified in the performance scenario.

The method declaration syntax may include a method name, parameter names, a method body, and a return size. The parameter name and return size are optional. The parameter field declares an input parameter for the method. The return size field finishes the method and defines the size of result message to be sent to the caller To invoke a method through another method or by a client transaction a method invocation syntax is used. The <invoke> tags in the XML code above is an example of invoking a method from within another method. A generic invoke tag is illustrated below:

```
<invoke [site="SiteName"] [host="HostName"] [oneway="1"]
  service="ServiceName" method="MethodName">
    [<param name="@paramname" value="value"/>]
</invoke>
```

The site argument specifies the target site name. The site argument can be a constant or any text expression. If omitted the current site is assumed.

The host argument specifies the host name where the target service will be called. The host argument can be any text expression. The host argument may be a function call to get the host name according to a policy. Text expressions can include text constants, variables, and string concatenation operators such as "+". If the host argument is omitted, then if the site value is the current site when the random selection policy is applied to find an appropriate host. If the site value is not the current site then the host is selected by the following criteria: the selected host contains the invoked service; the selected host is reachable from the current one; if a priority table is specified it is used in the selection.

If the oneway argument is specified the method is invoked asynchronously. The service argument specifies the service name. The method argument specifies the method name.

Client application models, such as Outlook in the example above, can be specified in an application model and represent end point system components that start transactions. A transaction is a single logically consistent business function performed within the modeled application. The client application models contain transaction declarations that correspond to the system entry points and define the structure and the sequence of the operations to compose the transaction instances.

Usually client application models map directly to the types of the end user applications or external services (e.g. Outlook, Internet Explorer, client application of a client-server system). The syntax of the client application definition is similar to the service syntax.

Each client application has a unique name within the application model script. The transactions of the client application models do not have input parameters. All client application transactions should be fully parameterized by the usage variables. Client application models can be shared by multiple client profiles.

The following is an example of a client application model for an internet browser.

```
<clientapplication name="IE">
    <transaction name="RequestHomePage">
        <invoke service="IIS" method="GetHomePage" />
    </transaction>
    <transaction name="RequestDescriptionPage">
        <invoke service="IIS" method="GetDescription" />
        <branch probability="0.05">
            <invoke service="IIS" method="BuyProduct" />
        </branch>
    </transaction>
</clientapplication>
```

The transaction declarations in the example above declare two transactions RequestHomePage and RequestDescriptionPage. Both transactions invoke methods on the IIS service. The RequestDescriptionPage transaction also invokes the BuyProduct method in 5% of all transaction instances.

A client profile is a named set of transaction invocation statements. The client profiles represent a user role with some consistent usage pattern that invokes transactions in the modeled application. Each transaction invocation is represented by a <usetransaction> tag and specifies the invocation mode, name of the transaction to invoke, the mean value of the transaction rate, and distribution of the transactions inter-arrival intervals. Before simulation, the client profiles are mapped to the computers that represent the client workstations and host one or more client applications required by the client profile. Once mapped, the client profiles induce as many transaction sources as users it represents. In one embodiment, rather than creating a number of identical client profiles, the rate of transactions can be simply multiplied by the number of users to virtualize client computers. Client workstation models are connected to one or more network models making communications available between the client application models and computer models hosting other application service models.

A transaction source may be defined as follows:

```
<ClientProfile name="UserTypeName">
    <usetransaction application="ClientApplicationName"
name="TransactionName" mode="generation mode" rate="rate"
numtransactions="num" poisson="A" exponential="B" uniform="C"/>
    ...
</ClientProfile>
```

The name field specifies the name of the transaction to generate. The mode field specifies the transaction generation mode. The transaction generation mode may be for example "transaction per second" (tps) or "saturation" as will be explained in more detail below. The rate field is used if the mode is tps. The rate field specifies the mean value for the transaction invocation rate in transactions per second. The numtransactions field is an integer >0. The "numtransactions" field, if specified, limits the number of transactions generated. The "numusers" field is an integer >0 and specifies the number of users for the "saturation" mode. If the "numtransactions" field is not specified, a default value, such as "1" may be used. The exponential field is an optional field expressed as a fraction. The exponential field can be specified if mode value is specified as tps. The exponential field specifies the relative proportion of the exponential distribution in the resulting distribution of the transaction inter-arrival rates. The uniform field is an optional filed expressed as a fraction. The uniform field can be specified if mode value is specified as tps. The uniform field specifies the relative proportion of the uniform distribution in the resulting, distribution of the transaction inter-arrival rates. The uniform field is a default value if no distribution is specified. The values for "exponential" and "uniform" attributes specify the proportion relatively to the sum of all values. In one embodiment, the "exponential" and "uniform" attributes do not have to be normalized to 1.0 as normalization can be done automatically. Notably, the preceding illustrates a number of examples of distributions that can be used. Other distributions can be used in alternative embodiments.

The following is an example of a client profile definition:

```
<ClientProfile name="WebUser">
    <usetransaction name="RequestHomePage" mode="tps" rate="0.2"/>
</ClientProfile>
<ClientProfile name="SearchRobot">
    <usetransaction name="RequestDescriptionPage" mode="tps"
rate="0.002"/>
</ClientProfile>
```

Figure 2:
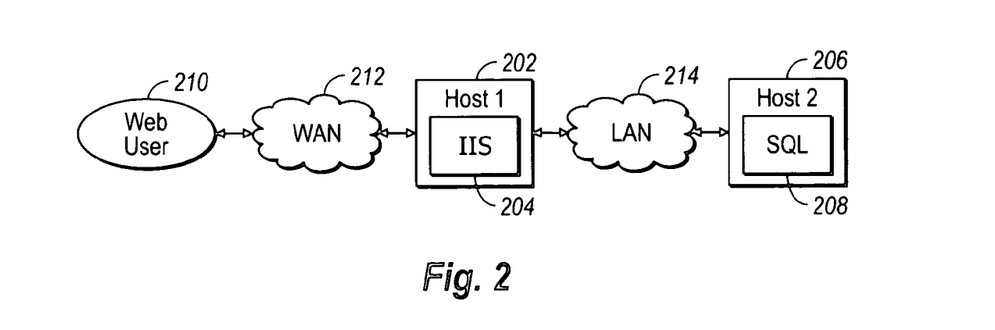
FIG. 2 illustrates a network connectivity model.

This client profile makes reference to the services definition script above and will be explained with reference to that script. Referring now to FIG. 2, a service deployment defined in a performance scenario 104 includes two host models where a first host model 202 hosts the IIS service 204 and the second host model 206 hosts the SQL services 208. A WebUser model 210 is connected via a WAN model 212 to the first host model 202. The first host model 202 is connected to the second host model 206 via a LAN model 214. As noted previously, the definition of the WebUser model specifies that the user will generate a RequestHomePage transaction with a frequency of 0.2 transactions per second. Because of the topology specified in the performance scenario 104 and the service models specified above, a RequestHomePage transaction will be expanded into a chain of actions such as the chain 300 shown in FIG. 3.

Figure 3:
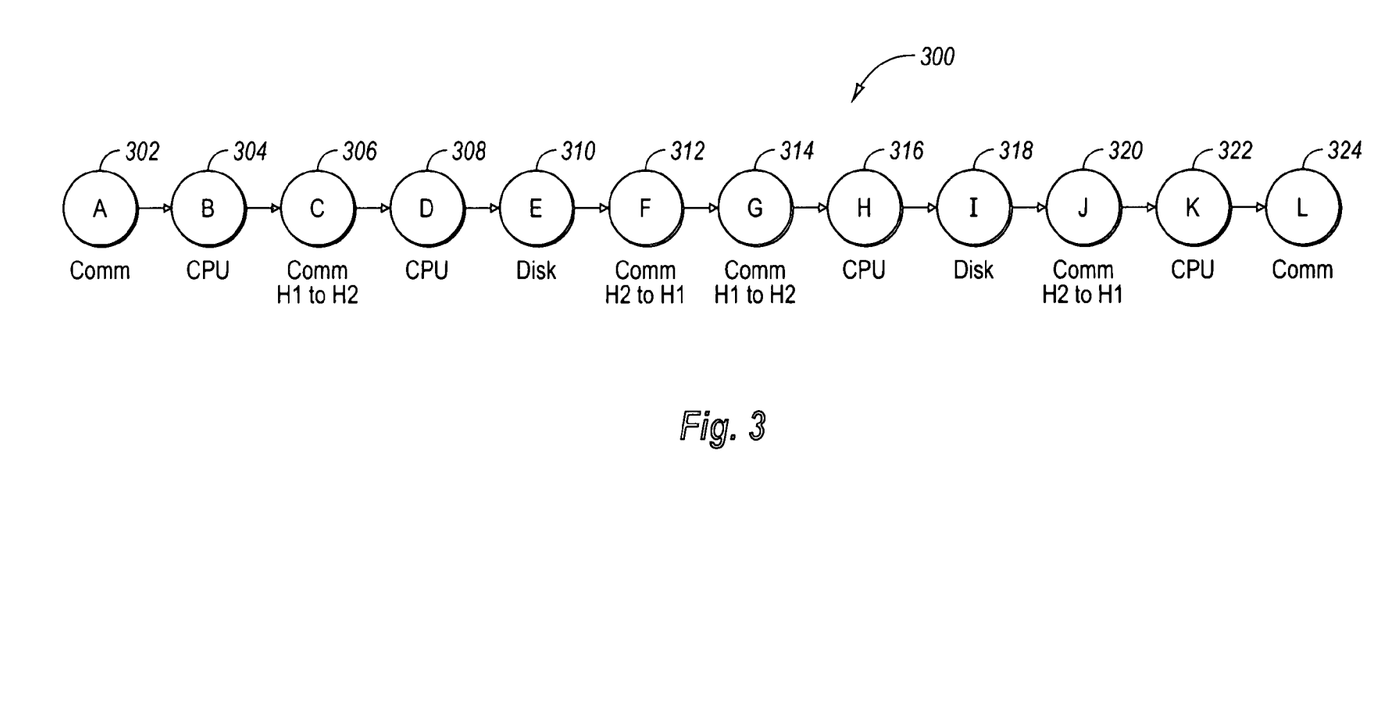
FIG. 3 illustrates hardware actions illustrated in an edge labeled directed graph.

Action A 302 represents a WAN communication from WebUser 210 to the first hosts 202 across the WAN 212. Action B 304 represent the first host performing 23000 MCycles as defined by the RequestHomePage method defined above. Action C 306 represents a LAN communication from the first host 202 to the second host 206 across the LAN 214 because of the invoking of the GetPersonalData method of the SQL service by the RequestHomePage method to Host2. Action D 308 represents 50000 MCycles being performed by the CPU at the second host 206 because of the definition of the GetPersonalData method defined above. Action E 310 represents a disk read of 10000 Bytes at the second host 206 because of the definition of the GetPersonalData method defined above. Action F 312 represents a LAN communication from the second host 206 to the first host 202 across the LAN 214 as specified by the return parameter of the GetPersonalData method. Action G 314 represents a LAN communication from the first host 202 to the second host 206 as specified by the invocation of the GetPageContents method by the GetHomePage method. Action H 318 represents 60000 MCycles performed by the CPU at the second host 206 as specified by the GetPageContents method of the SQL service. Action I 318 represents a disk read of 20000 Bytes at the second host 206 as defined by the GetPageContents method. Action J 320 represents a LAN communication from second host 206 to the first host 202 to perform the return specified in the GetPageContents method. Action K 322 represents CPU activities including 40000 MCycles performed at the first host 202 as specified in the GetHomePage method. Action L 324 represents a WAN communication from the first host 202 to the WebUser 210 as specified by the return statement in the GetHomePage method.

Embodiments described herein include functionality for dynamic generation of network actions and CPU actions depending on the hardware topology and software deployment specified in the performance scenario. For example actions C 306, F 312, G 314, and J 320 are included in the action chain 300 because the IIS service model 204 and SQL service model 208 are deployed on different host models. If both the IIS service model 204 and SQL service model 208 are deployed on the same host model, actions C 306, F 312, G 314, and J 320 are excluded from the action chain 300. While not illustrated in this example, CPU actions can be added into the chain 300 to model costs related to internal CPU activity when services are modeled on the same host model.

As noted above, service models 108 can be deployed on computer or host device models 102. If a single application service model 108 is deployed on multiple host models and the application logic allows using any of the service model instances available on a network, a runtime transaction generation engine may perform dynamic selection of a service model instance for every generated transaction.

If the target service is not stateless (such as Exchange Mail Store and unlike IIS) each peer service that invokes the target service operations is usually bound to a particular instance of the target service. To represent this binding the application model has a concept of service reference groups. The service reference groups allows the application models to have greater control over the service scheduling during simulation.

The service references groups allow the sets of destination service model instances for a source service model to be explicitly specified. When an application model service initiates a communication to another service such as by using an <invoke> operation, the application model performs a search for the destination service model. In this search, the source service model considers all service model instances, of the given destination service type, that are reachable for invocation given the current network architecture defined in the performance scenario. In the search, the source service model enumerates all computers accessible from that source service model and checks that the computer model has the destination service model. If more than one destination service model is found, the source service model performs selection of a single destination service model instance using a scheduling policy specified in the application model. The following is an example of simplified application model code:

```
1.    <applicationmodel name="DummyApp">
2.      <service name="A">
3.        <invoke service="B" />
4.      </service>
5.      <service name="B">
6.        <action class="DiskIO" datasize="1000" />
7.      </service>
8.    </applicationmodel>
```

Figure 4:
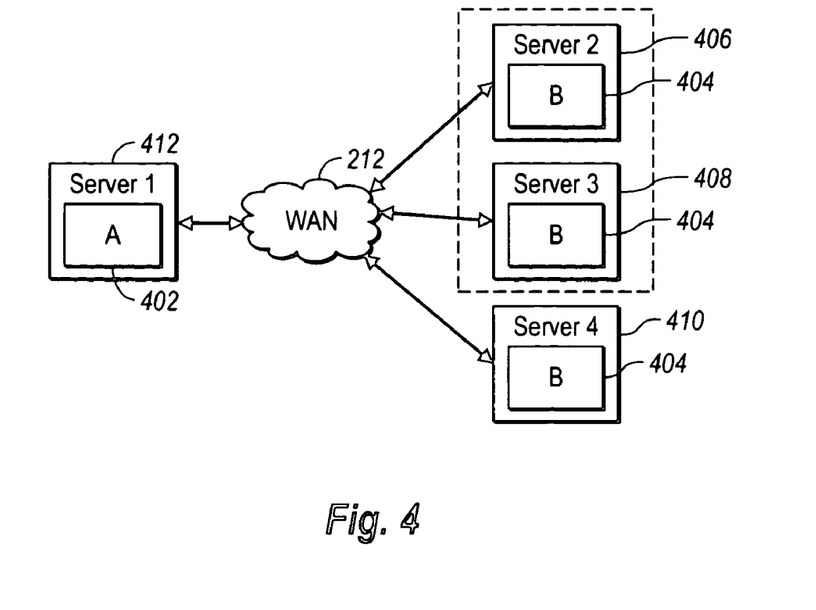
FIG. 4 illustrates defining a set of services accessible by another service.

Referring now to FIG. 4 When service A 402 invokes service B 404 at line #3 it creates a pool of destination candidates that in this case would include Server 2 406, Server 3 408, and Server 4 410. Then service A 402 selects one instance using "Random" scheduling policy. If the simulation runs long enough the service A 402 will be executed multiple times and all destination servers 406, 408 and 410 will be selected approximately the same number of times.

This, often, is not what takes place in the real system being modeled. In the real system, each instance of the service A 402 will be explicitly assigned a set of instances of service B 404, which set may only be a single item in some cases, so that only those instances of service B 404 that are included in the set can be considered as destination candidates. For example Microsoft Operation Manager Management service is configured to use a single SQL database event if there are multiple databases available on the network. In yet another example a Microsoft Exchange mail box account is assigned to a single mail box storage.

As such a set of service models can be specified in the performance scenario 104. The application model code can then make use of the set of service models specified in the performance scenario 104. For example assume that only the service B 404 on server 2 406 and server 3 408 are intended to be recipients of <invoke> commands from service A 402 on server 1 412. To define the service reference group in the performance scenario 104, the following syntax may be used:

```
<Computer Name="ServerC">
   <Services>
      <Service> <Name>A</Name>
      <References>
         <ServiceReferenceGroup Name="Dest">
            <ServiceReference Office="OfficeName"
   Computer="Server2"/>
      <ServiceReference Office="OfficeName" Computer="Server3"/>
            <ServiceReferenceGroup >
      </References>
      </Services>
</Computer>
```

The user transaction and/or service methods have implicit access to the context of the transaction being generated. In particular, there are a set of variables that can be declared/assigned/read by the service methods and be preserved within the transaction context. Such variables can be used by the service methods to modify the transaction flow and they also identify the transaction variations.

For example, an assign statement may be used to assign values to variables. The assign statement may be as follows. <assign value="X" [scope="scope"] var="@Y"/>. This statement assigns a value to a variable. The variable is automatically created if it does not exist. The value attribute is an expression for the value to be assigned to the variable. The scope attribute is an optional attribute that defines the scope of the variable. This may be for example, a method, service and/or transaction. The var attribute defines a variable name as a textual expression. The variable can be accessed by the services in the call chain for a transaction in which the variable is defined.

Sub services allow actions of the same class to be scheduled on different subsets of the appropriate device models. This is used if the modeled application is able to distinguish devices of the same type for different actions. For example some applications may specify that different types of disk I/O action should be performed by different disk drives. For example an application may specify that data disk I/O action be performed on one disk drive while log I/O actions are performed on a different disk drive. Log I/O actions may be sequential in nature while data disk I/O operations are often random in nature. Be separating the log I/O actions from the data I/O actions the sequential advantage of logging actions can be preserved.

Sub Services are optional and defined within a service declaration. Each sub service is associated with one action class. For example, a "DataStorage" sub service applies to a DiskIO action. Sub services can be mapped to specific device model instances in the performance scenario 104. The following is an example of a sub service declaration syntax:

```
<service name="ServiceName">
    <subservice name="SubServiceName" actiontype="diskio"/>
</service>
```

In this example, the name field defines the name of the sub service. The name should be unique in the service context. The actiontype field specifies the action class for the subservice. The "actiontype" field may be, for example, "compute" for processor actions, "diskio" for disk reads and writes, or "communication" for network communication actions.

As shown in previous examples, device actions can be generated by the <action> statement. When the action statement is executed, the appropriate action is generated and placed on a the transaction chain, which can be modeled as an edge labeled directed graph, which is then passed to a simulation engine for scheduling on device models 102 or to any other modeling component that requires transactions be presented as input.

The action generation statement has the following syntax:

```
<action type="action class" [name="action name"]
    [subservice="subservice name"] [policy="scheduling policy"]>
        <param name="param name" value="param value"/>
        <!-- more params if necessary -->
</action>
```

The type argument specifies the action class. This may be specified, for example, as compute, diskio, communication, or delay. Each action class prescribes a predefined set of workload parameters that are assigned in the subsequent <param> tags.

The name argument is an optional argument that specifies a reference name for the action. The action name, if specified, may be included in transaction logs to simplify model debugging.

The subservice argument is an optional argument which specifies the sub service name in which the action will be scheduled.

The policy argument is an optional argument which specifies the policy for selecting the device model during simulation for processing the action. Possible options for the policy argument are: random, roundrobin, and leastbusy. Random policy selects a device model with the probability of 1/n where n is the number of maintained devices. Roundrobin policy selects the next device model in a device loop. As such roundrobin policy requires keeping track of the last selected device model. Leastbusy policy selects the least utilized device model based on the average utilization. If leastbusy policy is specified and if some device models are equally utilized then the random policy is applied to those selected device models.

If no policy is specified and more that one device model is available to process the action in one embodiment, the "random" policy will be applied.

The param name argument defines a value for the action workload parameter. The param name argument is specified for each action parameter.

Background load profiles define sets of activities taking place in the modeled system due to some background work. The background work is considered out of scope of the modeled application and does not require simulation. The only considered effect of the background load is that it reduces the device capacity and therefore increases the device utilization and transaction latencies.

A performance scenario 104 can have the background profiles either turned on or off indicating whether the background load should be applied. If the profile is on then the respective background offsets are made to the device model's performance.

The background profiles can be declared outside of the application model 106 if they are not related to the application. If some application activity is considered as background load then the corresponding profile can be declared in the application model script.

The background profile includes background services. Each service can be mapped to a single computer model. A background service contains definitions for device loads. Each device load belongs to one of the action class types and defines the background utilization and the mapping scheme which determines to how many device instances the load can be applied.

The performance scenario 104 should allow mapping the background services to computer models and enabling and/or disabling entire profiles.

The following is an example of a background profile syntax:

```
<backgroundprofile name="profile name">
    <backgroundservice name="background service name">
        <deviceload type="action class" utilization="util" mapsto="?">
            <param name="param name" value="param value"/>
            <!-- other action class parameters -->
        </deviceload>
    </backgroundservice>
</ backgroundprofile>
```

The backgroundprofile name argument declares the background load profile name. The profile name is unique within the application model script. The backgroundservice name argument declares the named background load service.

The deviceload type argument declares background load on a single device. The type argument specifies the action class for the affected device. The utilization argument specifies the background utilization offset measured on the reference hardware whose configuration is described below in the parameters. The mapsto argument is an optional argument that specifies the number of devices that can be mapped to this background load. If the mapsto argument is omitted any positive number may be assumed. The param name and value arguments are device configuration parameters for the reference device used for measuring the utilization offset.

Below is an example of background load profile declaration:

```
<backgroundprofile name="ADReplication">
    <backgroundservice name="Replication">
        <deviceload type="compute" utilization="0.12">
            <param name="Family" value="PIII"/>
            <param name="ClockSpeed" value="800"/>
        </deviceload>
        <deviceload type="diskio" utilization="0.03" mapsto="1">
            <param name="SeekTime" value="100"/>
        </deviceload>
    </backgroundservice>
</backgroundprofile>
```

In this example 12% of utilization would be added to CPU if the actual CPU is PIII 800 MHz. If the actual CPU differs then the CPU model will make the rescaling.

The real software is not ideally scalable and software threads that process different transactions are interacting in many ways limiting the scalability and performance of the system. The software threads can communicate and compete over purely software resources that can limit performance at lesser load than the hardware throughput would if the software were ideally scalable.

In general the effect of software contention depends on the hardware throughput and the workload. Therefore if the hardware is not "fast enough" and/or the system usage level is low then the software contention may never be a performance bottleneck. This fact also has an opposite effect. If the model was created on "slow" hardware it may be not accurate on faster hardware as the software contention will be more noticeable.

Software synchronization mechanisms such as locks, critical sections, mutexes, events, semaphores, etc can cause software contention. Similarly, thread pools that limit the number of parallel threads may be a cause of software contention. Because the goal of application modeling is to represent the application model in such a way that it can be used in modeling systems with different hardware software contention is described considering the properties of the hardware and the applied workload. Alternatively, if the model is being built for a fixed combination of software and hardware, the software contentions can be modeled analytically by interpolation of the measured load vs. a response time curve.

The application model concepts described below will allow simulation of software contentions caused by various synchronization techniques. A service declaration can contain a definition of software resources. A software resource is an object over which the transactions can compete for access. The resource is associated with a model that prescribes the policies for handling seizing requests and with parameters that provide configuration info to the model.

The following is a resource syntax for declaring a resource.

```
<service name="service name">
    <resource name="resource name" model="resource model">
        <param name="param name" value="param value"/>
    </resource>
</service>
```

In this example, the resource name field declares a named software resource. The name is unique within the service. This resource can be referenced from the service methods, which are described below.

The model field specifies the resource model, i.e. lock, semaphore, etc. This parameter references a resource model from the models library. The models library can provide several basic resource models, for example the resource model may include a simple lock/mutex model and a semaphore model with counter which is also good for modeling thread pools. Other resource models can be developed separately and loaded into the models library if necessary.

The param field specifies parameter values for the resource model if any are required.

In the service method sections one can declare the usage of the resource by using the following transaction flow control statements:

```
<method name="UseResource">
    <!-- method body -->
    <seize resource="resource name">
        <param name="param name" value="param value"/>
    </seize>
    <!-- method body -->
    <release resource="resource name"/>
    <!-- method body -->
</method>
```

In this example, the seize resource field causes the transaction to obtain a lock on the resource according to the resource policy or wait until the lock is available. The transaction execution suspends until the lock is acquired.

The param field specifies parameters for the resource locking if required by the resource model. One exemplary parameter may include priority.

The release resource field causes the transaction to release the resource lock and let the queued request to proceed.

Usage variables are parameters of the application model 106 that should be assigned with specific values before executing the application model 106. The variables are used to configure the application model 106 in accordance with particular user scenario. Usually the usage variables will be assigned by the user while preparing the performance scenario 104 for simulation.

A usage variable has a name, description, type and value. The name is unique in the scope of the variable. The name is used to reference the variable in the application model script. The variable description can be used in a user interface to explain the purpose of the variable. The variable type prescribes the set of possible values, such as for example integer, floating point number, string, and Boolean expression. The value if specified contains an allowed value or range for the variable. These values can be used by the usage definition tool and verification procedure to verify user input.

Workload variables can be declared globally for the entire application model 106, or locally for a specific service model 108. All global variables are assigned while the local variables should be assigned only if the service model 108 is being used in the executed application model 106.

The application model 106 may allow for the creation of performance scenarios 104 that do not map all available application service models 108 to the device models 102. At the same time, some service models 108 may be mandatory and are required to be mapped. Therefore each application model 106 defines certain deployment constraints that identify the boundaries of possible deployments. The performance scenario 104 should be validated against those constraints before the simulation takes place to make sure that the performance scenario 104 actually represents a realistic deployment.

The application model may include transaction flow control statements when defining transactions instantiated by service models 108 and methods 110. The if statement selects a branch for execution based on the value of logical expression in the condition attribute.

A branch statement can wrap arbitrary actions and specify probability with which the branch is executed. Additionally, the branch statement may optionally specify a repeat variable. This is allowed only for a branch within a fork (described below) and makes the branch replicate n times. All resulting branches will be added to the fork for simultaneous simulation.

Rather than defining several linear transactions, each with a different frequency, a user can specify a single transaction tree, with probabilities for taking different paths through the tree. These paths are chosen using a switch statement, which encloses one or more branch statements, each with a relative frequency. The frequencies are normalized by the system. When an instance of the transaction is generated, a random branch is chosen, according to the relative frequencies given.

A loop statement can be used to repeatedly issue the same sequence of actions in a transaction. A simple count is used to specify the number of times to loop.

A fork statement can be used to cause simultaneous execution of different sequences of actions within a single transaction along two or more branches.

A branch may optionally be replicated a given number of times. This allows the number of branches to be chosen at runtime.

The application model translator allows for extending the functions list by providing a mechanism for adding new user defined assemblies that contain functions implementations. Thus, new functions can be added to application models by supplying new assemblies to libraries with the functions.

At runtime the simulation engine preferably uses a fast mechanism for generating transactions that are represented as sequences of hardware operations. This way the simulation engine can simulate the models of application transactions faster than they are processed by the actual application. The simulation engine may achieve this by translating the application model from a high level domain specific language to a generic purpose low level programming language such as C#. The result code can be compiled into an IL assembly. The application model can then be shipped to customers in a form of a signed assembly such as a NET assembly that is ready to be loaded into the simulation engine.

In one embodiment, the application model is translated to the low level programming language using the following set of translation rules:

| Application Model construct | C# translation |
| --- | --- |
| Service | C# class |
| Service method | Public method of C# class |
| Invoke operation | A series of operations:<br>1. Dynamically generate communication action to the target service;<br>2. Call the target service method;<br>3. Dynamically generate communication action from the target service. |
| Hardware action operation | Workload generator API call to add an action element to the current transaction |
| Subservice declaration | C# field declaration |
| Service reference group declaration | C# field declaration |
| APML expression | C# expression |

With the described translation the simulation engine only needs to invoke a service method that is defined in the client profile declaration as the entry point for the transaction to generate the transaction string. An execution runtime can then execute the application model code that will fill in the current transaction. The transaction string is then passed to the device simulator for evaluation against the device models.

As the application model executes it calls the workload generation API to add the hardware actions to the current transaction. The current transaction is empty before the transaction generation process is started. The workload generator invokes the entry point method for the transactions and waits for the application model to complete the transaction generation. When the application model finishes generating the transaction the simulation engine retrieves the fully generated transaction from the current transaction context.

Figure 5:
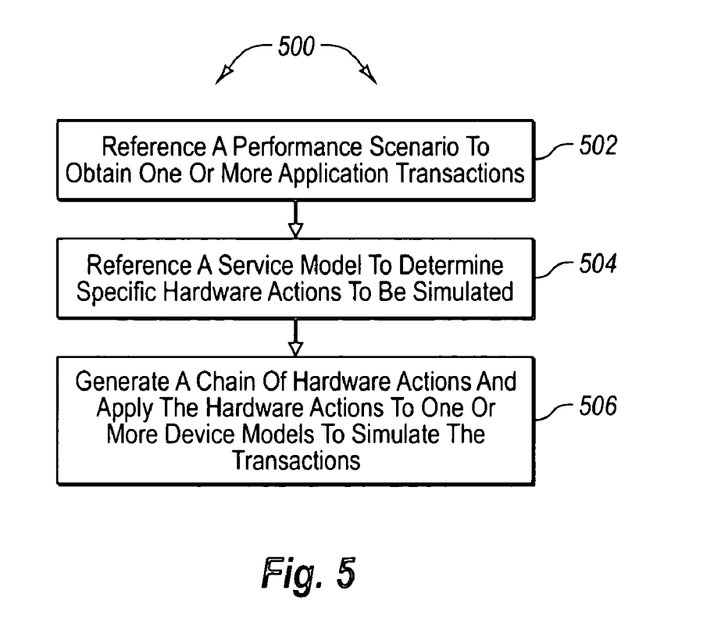
FIG. 5 illustrates a method of dynamic transaction generation.

Referring now to FIG. 5, a method 500 for simulating an application is illustrated. The method may be practiced, for example, in a computing environment configured for simulating one or more applications modeled by respective application models. The application model models an application that may be modeled in a performance scenario of a computing system by mapping service models of the application model to device models modeling devices in the computing system in the performance scenario. The method 500 includes referencing a performance scenario to obtain one or more application transactions (act 502). The transaction declaration specifies the invocation of the entry service model of an application model. The entry service model specifies specific hardware actions to be simulated. Notably, the hardware action may be specified directly in the service model, or may be specified by reference to other service models as will be explained in more detail below.

The method 500 further includes referencing the first service model to determine the specific hardware, actions to be simulated (act 504).

A chain of hardware actions are generated and the hardware actions are applied to one or more device models to simulate the transaction (act 506). In one embodiment, the first service may include sub-service mapping defined in the performance scenario to select an appropriate device model.

As noted previously, the first service model may invoke a second service model. The second service model may invoke any number of other service models and/or may include specific hardware actions such as cpu cycles and I/O reads and/or writes. In one embodiment, the first service invokes the second service model by invoking a service model specified in a set of service models defined in the performance scenario. For example, as illustrated above, it may be desirable to constrain the instances of a second service model that can be invoked. This can be done by defining a set of services that can be invoked by an instance of the first service model. In one embodiment the first service invokes the second service model using a scheduling policy to select the second service model from the set of service models defined in the performance scenario. Such scheduling policies may include one or more of round-robin, random, weighted random, etc.

In one embodiment, the first service model is deployed on a first host device model and the second service model is deployed on a second host device model. Generating a chain of hardware actions in this example may include generating network hardware actions including network communication actions from the first host device model to the second host device model to invoke the second service.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of simulating a computing system, the method comprising a computer system performing the following:
    referencing a first data structure defining an application model to model a computer application, wherein the application model comprises:
        service models defined within the application model, the services models being designed to model application modules that process requests to implement functionality of the computer application, the definition of service models comprising definitions of hardware actions, wherein the service models are defined independent of definitions of hardware device models, wherein the hardware actions include:
        a number of cycles for a cpu;
        various sizes and types for Input/Output for a hard disk drive, the types specifying at least one of:
            a sequential read;
            a random read;
            a sequential write; or
            a random write, and
        an amount of network traffic;
    referencing one or more second data structures defining hardware device models, the hardware device models including definitions of computer hardware characteristics, including:
        a hard disk drive model defining a modeled latency for simulating and defining the hard disk latency according to I/O size, the model including:
            a property defining a constant for random reads;
            a property defining a slope for random reads;
            a property defining a constant for sequential reads;
            a property defining a slope for sequential reads;
            a property defining a constant for random writes;
            a property defining a slope for random writes;
            a property defining a constant for sequential writes; and
            a property defining a slope for sequential reads;
            such that a modeled hard disk latency can be calculated given the type of I/O operation and using a constant, an associated slope, and I/O size;
        latency for a cpu; and
        bandwidth for a network hardware model;
    referencing a performance scenario defining interconnections between the hardware device models and defining where the service models are applied to the hardware device models; and
    simulating the computer application in a hardware environment defined by the performance scenario.

2. The method of claim 1, wherein the application models comprises a first service model and a second service model, wherein the first service model includes an invocation of the second service model such that the functionality of the first service model includes the functionality of the second service model.

3. The method of claim 1, wherein the application model is embodied in a low level programming language compiled from a high level domain specific language.

4. The method of claim 3, wherein the low level programming language is C#.

5. The method of claim 1, further comprising executing computer executable instructions defining a workload generator to generate workload requests applied to the hardware device models instantiated in the performance scenario.

6. The method of claim 1, wherein the first data structure comprises XML code.

7. The method of claim 1, wherein the first data structure further comprises a user defined assemblies field including user designed functions that can be implemented by the application model.

8. The method of claim 1, wherein the first data structure comprises information describing at least one of software contention or a background load for the application model.

9. The method of claim 1, wherein simulating the computer application in a hardware environment defined by the performance scenario comprises:
    generating a chain of computer hardware actions by executing device action statements defined in the service models and adding an action to the hardware chain when each action statement is executed so as to model the chain as an edge labeled directed graph of computer hardware actions; and
    applying the computer hardware actions to the one or more hardware device models.

10. In a computing environment configured for simulating computer application modeled by an application model, the application model modeling a computer application that is deployed in a performance scenario of a computing system by deploying service models of the application model to hardware device models modeling devices in the computing system in the performance scenario, a method of simulating the computer application, the method comprising a computing system performing the following:
    referencing a performance scenario to obtain a next transaction of a computer application to be modeled, the transaction specifying the invocation of a first service model of an application model modeling the computer application, the first service model specifying specific computer hardware actions to be simulated;

referencing the first service model to determine the specific computer hardware actions to be simulated but wherein the service models are defined independent of definitions of hardware device models; and generating a chain of computer hardware actions by executing hardware action statements defined in the service model and adding an action to the hardware chain when each action statement is executed so as to model the chain as an edge labeled directed graph of computer hardware actions, the edge labeled directed graph including nodes representing hardware actions and edges connecting the nodes and defining the order of the hardware actions, the hardware actions in the chain being at least one of a disk I/O operation, processor cycles, or network communications;

passing the graph to a simulation engine and applying the computer hardware actions to one or more hardware device models modeling computer hardware to simulate the transaction, and wherein the hardware device models include definitions of computer hardware characteristics, including:

a hard disk drive model defining latency according to I/O size, the model including:
  a property defining a constant for random reads;
  a property defining a slope for random reads;
  a property defining a constant for sequential reads;
  a property defining a slope for sequential reads;
  a property defining a constant for random writes; and
  a property defining a slope for random writes;
  a property defining a constant for sequential writes,
  a property defining a slope for sequential reads;
  such that a modeled hard disk latency can be calculated given the type of I/O operation and using a constant, an associated slope, and I/O size;

latency for a cpu; and bandwidth for a network hardware model.

11. The method of claim 10, wherein the first service model invokes a second service model.

12. The method of claim 11, wherein the first service model is mapped to a hardware device model and the second service model is mapped on another hardware device model, and wherein generating a chain of hardware actions comprises dynamically generating hardware actions including network communication actions from the first hardware device model to the other hardware device model to invoke the second service.

13. The method of claim 11, wherein the first service model invokes the second service model by invoking a service model instance specified in a set of service model instances defined in the performance scenario, wherein the set of service model instances is declared in the first service model and the declaration is independent of any performance scenario.

14. The method of claim 13, wherein the first service model invokes the second service model using a scheduling policy to select the second service model instance from the set of service model instances defined in the performance scenario.

15. The method of claim 11, wherein generating a chain of hardware actions is determined by sub-service mapping defined in the performance scenario.

16. A computer readable storage medium comprising computer executable instructions that when executed by a processor perform the method of claim 10.

* * * * *

UNITED STATES PATENT AND TRADEMARK OFFICE
CERTIFICATE OF CORRECTION

PATENT NO.       : 8,073,671 B2
APPLICATION NO.  : 11/394474
DATED            : December 6, 2011
INVENTOR(S)      : Efstathios Papaefstathiou et al.

It is certified that error appears in the above-identified patent and that said Letters Patent is hereby corrected as shown below:

In Column 21, line 30, in Claim 10, after "writes;" delete "and".

Signed and Sealed this
Seventh Day of February, 2012

David J. Kappos
*Director of the United States Patent and Trademark Office*